(12) United States Patent
Reeb et al.

(10) Patent No.: US 9,015,939 B2
(45) Date of Patent: Apr. 28, 2015

(54) METHOD FOR INCREASING THE STRENGTH OF COMPONENTS

(75) Inventors: Alfons Reeb, Aalen (DE); Jochen Schmidt, Schwäbisch Gmünd (DE)

(73) Assignee: Maschinenfabrik Alfing Kessler GmbH, Aalen (DE)

( * ) Notice: Subject to any disclaimer, the term of this patent is extended or adjusted under 35 U.S.C. 154(b) by 1312 days.

(21) Appl. No.: 12/642,267

(22) Filed: Dec. 18, 2009

(65) Prior Publication Data

US 2010/0146753 A1    Jun. 17, 2010

Related U.S. Application Data

(63) Continuation-in-part of application No. PCT/EP2008/004814, filed on Jun. 16, 2008.

(30) Foreign Application Priority Data

Jun. 20, 2007 (DE) .......................... 10 2007 028 888

(51) Int. Cl.
| | |
|---|---|
| B23P 17/00 | (2006.01) |
| C23C 8/24 | (2006.01) |
| B21H 7/18 | (2006.01) |
| B24B 39/04 | (2006.01) |
| C23C 8/30 | (2006.01) |
| C23C 8/36 | (2006.01) |
| C23C 8/80 | (2006.01) |
| F16C 3/06 | (2006.01) |

(52) U.S. Cl.
CPC ...... *C23C 8/24* (2013.01); *B21H 7/185* (2013.01); *B24B 39/04* (2013.01); *C23C 8/30* (2013.01); *C23C 8/36* (2013.01); *C23C 8/80* (2013.01); *F16C 3/06* (2013.01)

(58) Field of Classification Search
CPC .............. C23C 8/24; C23C 8/30; C23C 8/36; C23C 8/80; F16C 3/06; B24B 39/04; B21H 7/185
USPC ................... 29/6.01, 888.01, 888.08, 402.05, 29/402.06; 72/107, 110
See application file for complete search history.

(56) References Cited

U.S. PATENT DOCUMENTS

| | | | |
|---|---|---|---|
| 4,460,415 A | 7/1984 | Korhonen et al. | |
| 5,009,001 A | * 4/1991 | Deschler | .................... 29/888.08 |

(Continued)

FOREIGN PATENT DOCUMENTS

| | | |
|---|---|---|
| DE | 2141175 A1 | 2/1973 |
| DE | 4328598 | 3/1995 |

(Continued)

OTHER PUBLICATIONS

Human Translation of DE2141175; Semenow; 1973.*

*Primary Examiner* — Ryan J Walters
(74) *Attorney, Agent, or Firm* — Wells St. John P.S.

(57) ABSTRACT

In a method for increasing the strength of a component subjected to torsional and flexural stress, in particular of a crankshaft, in a first step essentially the entire component is provided with a nitriding layer. In a second step, the nitriding layer is at least partially removed in at least one highly stressed region of the component by means of cutting machining, and, in a third step, the at least one highly stressed component region freed of the nitriding layer is mechanically strain-hardened.

11 Claims, 6 Drawing Sheets

(56) References Cited

U.S. PATENT DOCUMENTS

| | | | |
|---|---|---|---|
| 5,397,188 | A | 3/1995 | Yoshizuka et al. |
| 5,493,761 | A | 2/1996 | Bone |
| 6,393,885 | B1 | 5/2002 | Cadena |
| 6,691,543 | B2 | 2/2004 | Steffens et al. |
| 6,990,842 | B2 * | 1/2006 | Heimann ................ 72/110 |
| 7,827,684 | B2 * | 11/2010 | Heimann et al. ........ 29/888.08 |
| 2002/0178775 | A1 | 12/2002 | Steffens et al. |
| 2003/0012673 | A1 * | 1/2003 | Esumi et al. .......... 418/179 |
| 2006/0150405 | A1 * | 7/2006 | Heimann et al. ........ 29/888.01 |
| 2007/0169532 | A1 | 7/2007 | Reeb et al. |

FOREIGN PATENT DOCUMENTS

| | | |
|---|---|---|
| DE | 102004008728 A1 | 9/2005 |
| EP | 1211026 | 6/2002 |
| EP | 0788419 B1 | 1/2003 |
| EP | 1112146 B1 | 5/2003 |
| EP | 1149663 B1 | 6/2003 |
| EP | 1479480 A1 | 11/2004 |
| EP | 1612290 A1 | 1/2006 |
| JP | 04-198463 | 7/1992 |
| JP | 2001254143 | 9/2001 |
| JP | 2007030115 | 2/2007 |
| WO | WO2005/063438 A1 | 7/2005 |

* cited by examiner

METHOD FOR INCREASING THE STRENGTH OF COMPONENTS

CROSS REFERENCE TO RELATED APPLICATION

This application is a Continuation-in-Part patent application of, and claims priority to, PCT International Application Number PCT/EP2008/004814 which was filed Jun. 16, 2008 and was published in German, and which claims priority to German Patent Application No. 10 2007 028 888.5 which was filed Jun. 20, 2007, and the teachings of all documents are incorporated herein by reference.

The invention relates to a method for increasing the strength of a component subjected to torsional and flexural stress, in particular of a crankshaft. The invention relates, furthermore, to an apparatus for the mechanical strengthening of a component subjected to torsional and flexural stress, in particular of a crankshaft.

Since internal combustion engines are subjected to ever greater stress, in the course of their development, due to the constantly growing increase in power, the engine industry demands very stringent strength requirements precisely from the crankshaft which undergoes very high load and is extremely important for the functioning of an internal combustion engine, while at the same time, because of the extremely critical space requirement, the crankshaft should become only insignificantly larger in spite of the increases in power. This means, for the design of the crankshaft, that an increase in the stress-bearing capacity should not be achieved by increasing the cross section, that is to say via the moment of resistance of the crankshaft, but, as far as possible, via local stress states. For this reason, modern crankshafts are produced, using the most diverse possible machining and heat treatment methods, so that the crankshafts can be exposed to ever higher engine powers.

Examples of such methods are thermal treatments, such as the surface hardening methods of induction hardening and casehardening, laser hardening or nitriding, and also strain hardening methods, such as close rolling, shot peening and impact hardening. These are commonly employed and largely perfected methods which are suitable for the most diverse possible applications.

As examples of such methods, reference is made to the following publications: EP 1 479 480 A1, EP 0 788 419 B1, EP 1 149 663 A1, DE 43 28 598 A1, WO 2005/063438, EP 1 112 146 B1, JP 04198463 A, JP 2001254143 A, EP 1 612 290 A1 and DE 10 2004 008728 B4.

A nitriding method, such as is described, for example, in EP 1 612 290 A1, affords the advantage, when used on a crankshaft, that both the entire outer region of the crankshaft and inner regions, such as bores and the like, are enclosed by a surface nitriding layer. This nitriding layer may have a depth of up to 0.8 mm, depending on the method adopted. The advantage of such a nitriding layer is that the most diverse possible notches, near-surface material inclusions outside the bearing faces and transition radii are incorporated, with the result that precisely these component regions are neutralized as stress-critical regions due to internal pressure stresses introduced as a consequence of the method. As a result, overall, a higher stress-bearing capacity of the crankshaft can be achieved. Particularly in the case of high torsional loads which are typical in crankshafts, such a nitriding method affords very good results, particularly with regard to fatigue strength. Moreover, as compared with the likewise available and sometimes also used possibility of employing high-alloy steels for producing the crankshaft, nitriding is a relatively cost-effective method.

However, the disadvantage of such nitriding treatments on components subjected to torsional and flexural stress is often that the depth action in notch regions is lower than in other surface treatment methods. In many highly stressed components, such as, for example, crankshafts, however, it is precisely in the transition regions between the bearings and the crank webs that such a depth action is desirable, since higher flexural stresses can thereby be permitted in a load situation.

In the design of a highly stressed crankshaft, it was therefore often necessary in the past to weigh up whether the flexural or torsional stress entailed the lower reserves, and a suitable method for increasing the strength of the crankshaft was then selected according to this weighing-up.

If the decision on treating the component was not in favor of a nitriding method, higher-grade and higher-tempered materials were often adopted in order to compensate the lower torsional fatigue strength. This mostly led to a cost rise which is undesirable precisely in automobile construction.

An apparatus for the close rolling of crankshafts is known from EP 1 112 146 B1. In this case, the force applied by the close rolling head is absorbed by two supporting rollers, axial guidance being afforded by an axial guide roller.

The object of the present invention is to provide a method for increasing the strength of a component subjected to torsional and flexural stress, which makes it possible to have high torsional fatigue strength and a high depth action in notch regions for achieving a high flexural fatigue strength and which nevertheless allows the use of relatively cost-effective materials.

This object is achieved, according to the invention, by means of the features mentioned herein wherein originally filed claim 1 recites: A method for increasing the strength of a component subjected to torsional and flexural stress, in particular of a crankshaft (1), in a first step essentially the entire component being provided with a nitriding layer (6), in a second step the nitriding layer (6) being at least partially removed in at least one highly stressed region (5) of the component by means of cutting machining, and, in a third step, the at least one highly stressed component region (5) freed of the nitriding layer (6) being mechanically strain-hardened.

According to the present invention, therefore, in a first step, essentially the entire component is nitrided, with the result that the component is afforded the advantages arising from this surface treatment, to be precise, in particular, the high surface hardness, good running properties and high torsional fatigue strength. Owing to the subsequent at least partial removal according to the invention of the nitriding layer in the regions of the component which are subjected to high flexural stress and to the following mechanical strain hardening of these highly stressed regions, furthermore, a considerable increase in the strength of these notch regions is achieved, particularly with regard to their flexural stress-bearing capacity. It is thereby advantageously possible to use less highly tempered materials for producing the component and nevertheless to obtain a torsionally and flexurally stressed component which is capable of withstanding all the critical loads occurring during use. The force applied to the component during strain hardening can in this case be adapted to the respective conditions, in particular to the stresses to be expected when the component is being used.

The removal according to the invention of the nitriding layer before the strain hardening of the highly stressed regions of the component by means of cutting machining ensures that the nitriding layer is not damaged during the subsequent strain hardening, in particular that no cracks are formed in this, as would be the case if the strain hardening were being carried out on a component region provided with the nitriding layer.

Overall, therefore, this is a method by means of which the component stresses to be expected in each case can be influenced in a highly flexible way, thus affording novel possibilities of configuration in the design of components subjected to torsional and flexural stress.

In a highly advantageous development of the method according to the invention, there may be provision for a final machining of the component in terms of its positional and/or dimensional tolerances to take place after the mechanical strain hardening. A dimensionally accurate component which can be used directly is thus obtained.

In a further advantageous refinement of the invention, there may be provision for the mechanical strain hardening to be carried out by means of close rolling. This, in addition to increasing the strength, gives rise to a very good surface of the strengthened region. Alternatively to this, it is also possible that the mechanical strain hardening is carried out by means of impact hardening or by means of shot peening.

In order to avoid a final machining of the component in the highly loaded regions, moreover, there may be provision for further material of the component also to be removed in addition to the nitriding layer, in order to form an undercut in the at least one highly loaded region.

The method according to the invention is to be used advantageously particularly when a crankshaft, in particular an especially highly stressed crankshaft, is used as the component subjected to torsional and flexural stress.

Moreover, in this respect, there may be provision for the at least one highly stressed region to be a transition region from a main bearing or connecting rod bearing to a crankshaft.

Disclosed is an apparatus for the mechanical strengthening of a component subjected to torsional and flexural stress wherein the originally filed claim 14 recites: An apparatus for the mechanical strain hardening of a component subjected to torsional and flexural stress, in particular of a crankshaft (1), with a strengthening tool (10) suitable for applying a force to the component, and with a steading device (11) which absorbs the force of the at least one strengthening tool (10) and which is mounted by means of a bearing device (15) in such a way that it is capable of absorbing forces which are introduced by the strengthening tool (12) in the case of slight oblique positions of the latter and which act obliquely on the surface of the component (1).

This apparatus is suitable particularly for carrying out the third step of the method according to the invention, to be precise the mechanical strain hardening of the highly stressed regions of the component. In this case, even in the case of slight oblique positions of the strengthening tool, it is ensured that edge pressures upon the nitriding layer and therefore possible damage to this are prevented.

In a particularly advantageous refinement of this apparatus, there may be provision for the at least one strengthening tool to have strengthening rollers.

Further advantageous refinements and developments of the invention may be gathered from the remaining subclaims. Exemplary embodiments of the invention are illustrated in principle below, with reference to the drawing in which:

Figure 1:
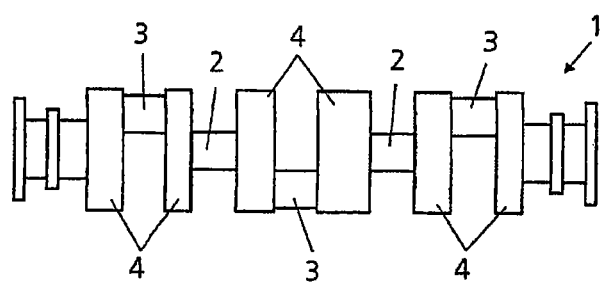
FIG. 1 shows a highly diagrammatic view of a crankshaft.

FIG. 1 shows a highly diagrammatic view of a crankshaft 1 which has in the way known per se a plurality of main bearings 2, via which it is mounted within a crankcase, not illustrated, of an internal combustion engine. The crankshaft 1 may be both a crankshaft 1 employed in a motor vehicle and a very large crankshaft 1 used, for example, in ships' drives. Between the main bearings 2 are located respective connecting rod bearings 3, on which connecting rods, likewise not illustrated, of the internal combustion engine can be mounted. In a way known per se, the number of main bearings 2 and of connecting rod bearings 3 is determined by the number of cylinders of the internal combustion engine. Between the main bearings 2 and the connecting rod bearings 3 are located in each case what are known as crank webs 4 which bridge the radial distance between the main bearings 2 and the connecting rod bearings 3. The transition region from the crank webs 4 to the main bearings 2 or connecting rod bearings 3 is generally, in the crankshaft 1, in each case a very highly stressed region 5, that is to say a region in which the crankshaft 1 has to absorb very high forces during operation. In order to achieve the sufficient strength of the crankshaft 1 even in these highly stressed regions 5, a method described in more detail below has been developed. Instead of being carried out on the crankshaft 1, the method may in principle also be carried out on another component which is subjected to torsional and flexural stress and the strength of which is to be increased by means of this method.

Figure 2:
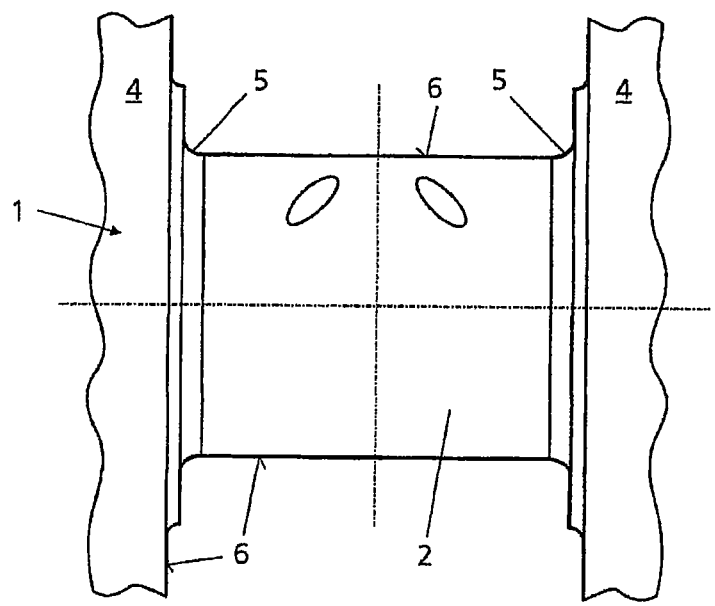
FIG. 2 shows part of the crankshaft from FIG. 1 as a component which is subjected to torsional and flexural load and on which a first step of the method according to the invention has been carried out.

In a first step of this method, the entire crankshaft 1, of which FIG. 2 illustrates only one of the main bearings 2 and parts of the crank webs 4 adjoining them, is nitrided, that is to say is provided with a nitriding layer 6 which extends over the entire crankshaft 1. The nitriding layer 6 may be applied, for example, by means of gas nitriding, by means of carbonitriding or by means of plasma nitriding. This nitriding layer 6 also relates to the most diverse possible notches, not illustrated, near-surface material inclusions and lubricating oil bores and the like. The nitriding layer 6 thus increases the load-bearing capacity and torsional rigidity of the crankshaft 1 and reduces the potential wear of the surface on account of the increased surface hardness. The advantages of the nitriding treatment arise particularly in the case of crankshafts 1 which have relatively narrow crank webs 4, since these are subjected to particularly high torsional stress.

Figure 3:
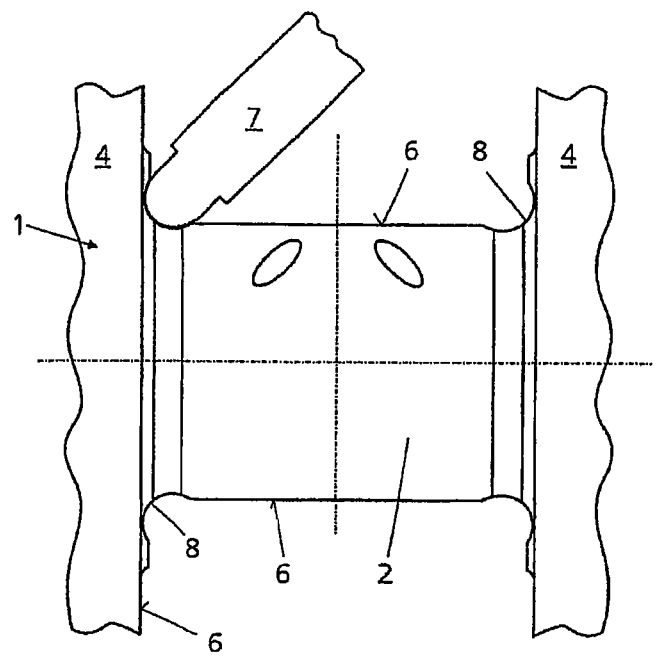
FIG. 3 shows the crankshaft from FIG. 2 in a second method step.
Figure 4:
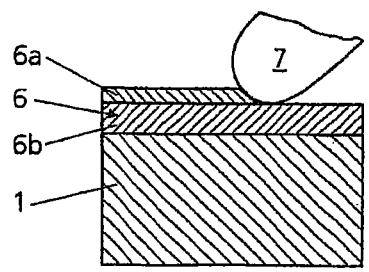
FIG. 4 shows an enlarged illustration of the second method step.

Since only relatively low depth action is obtained precisely in the highly stressed regions 5 at the transition between the main bearing 2 or the connecting rod bearing 3, not illustrated in FIG. 2, to the crank webs 4 by the nitriding layer 6, in a second method step illustrated in FIG. 3 the nitriding layer 6 is removed in the highly stressed region 5 of the crankshaft 1 by means of cutting machining. This cutting machining, for which a machining tool 7 indicated merely diagrammatically is employed, may take place, for example, by means of turning, milling or grinding. In addition to the nitriding layer 6 which, of course, forms part of the crankshaft 1, further material, that is to say material not belonging to the nitriding layer 6, of the crankshaft 1 may also be removed, in order in the highly stressed region 5 to form an undercut 8 which may be provided both radially and axially. As a result, a step, described at a later time, of strengthening the material of the crankshaft 1 can be carried out more simply and more effectively. This, however, depends on the design of the crankshaft and is not always necessary. The highly stressed region 5 between the main bearing 2 or the connecting rod bearing 3 and the associated crank web 4 is in the present instance in each case provided with a radius or designed as a radius. Irrespective of whether material of the crankshaft 1 is also removed in addition to the nitriding layer 6 or not, the transition between the main bearing 2 or the connecting rod bearing 3 and the crank web 4 may, after machining, be designed as a transition radius tangent to the respective face.

Figure 5:
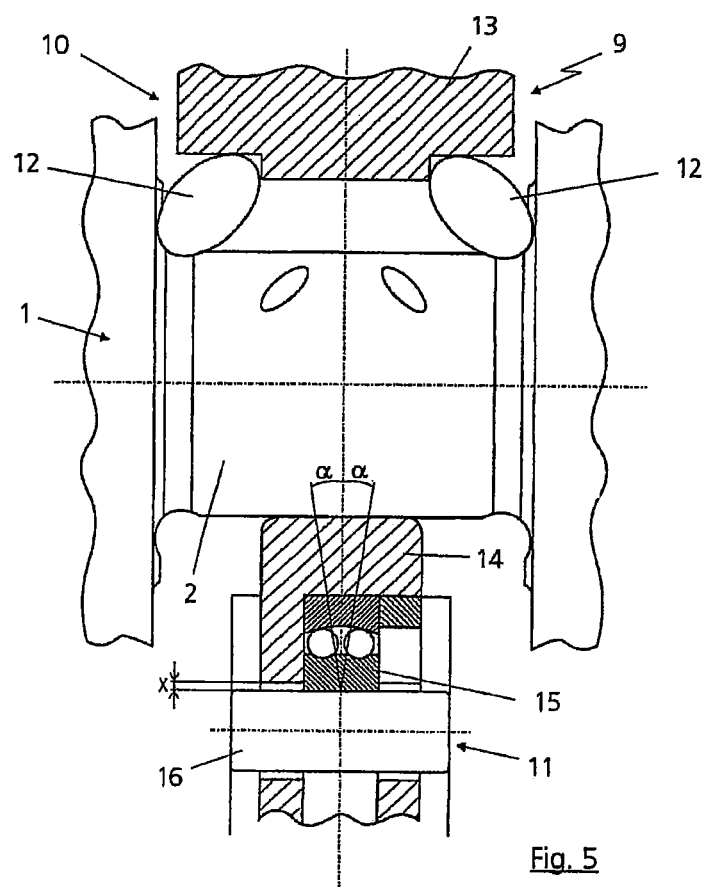
FIG. 5 shows the crankshaft from FIG. 2 in a third method step, using an apparatus according to the invention.

In FIG. 5, the nitriding layer 6 is illustrated, enlarged, and it can be seen that this has a bonding layer 6a forming the outer surface and a diffusion layer 6b lying beneath it and contiguous to the remaining material of the crankshaft 1. In contrast to the above-described complete removal of the nitriding layer 6, in which the undercut 8 can also be produced, in this case only the bonding layer 6a is removed, which constitutes an additional meaning of the particular "at least partial removal of the nitriding layer 6" to the above-indicated removal of the nitriding layer 6 only in the highly stressed region 5. It is therefore possible to remove only the bonding layer 6a of the nitriding layer 6 solely in the highly stressed region 5. A further possibility is also to remove part of the thickness of the diffusion layer 6b in addition to the bonding layer 6a.

Figure 6:
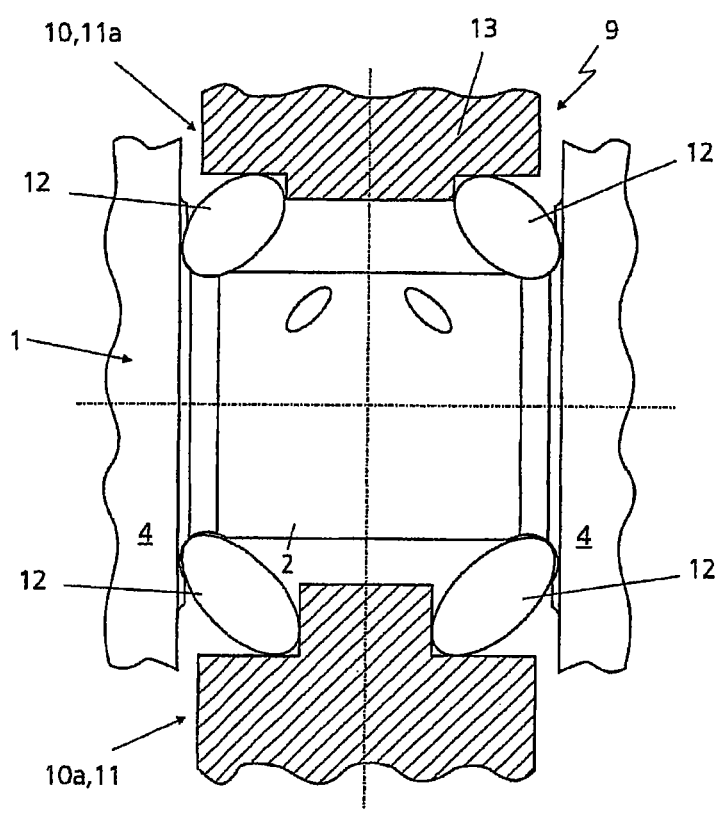
FIG. 6 shows the method step from FIG. 5 with an alternatively configured apparatus.
Figure 7:
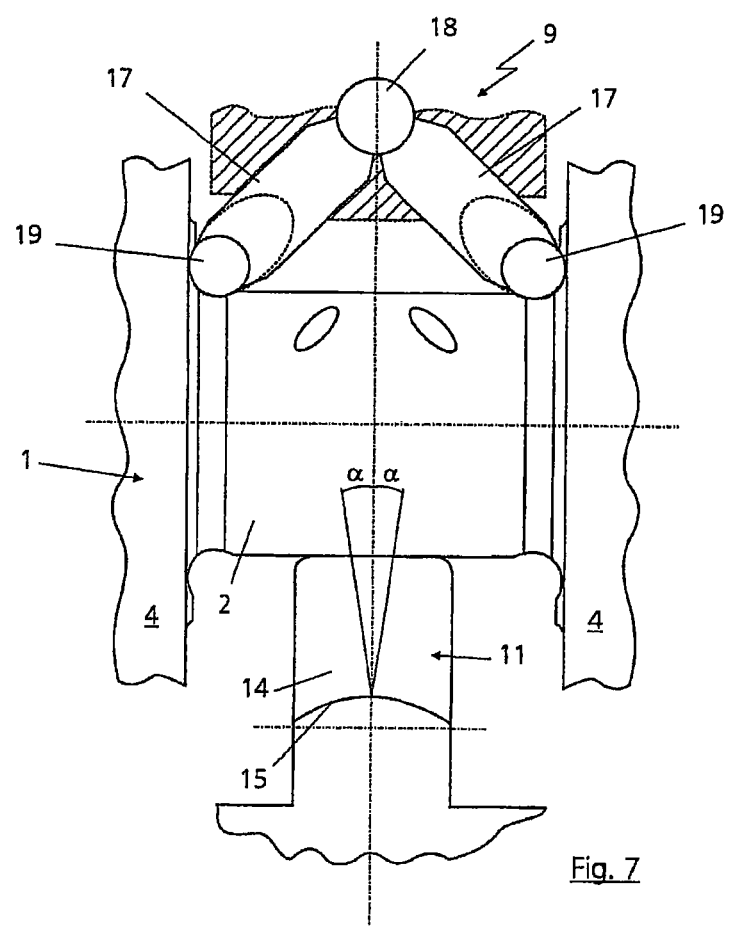
FIG. 7 shows a further alternative embodiment of the apparatus for carrying out the third step of the method according to the invention.

In the third step of the method, which is illustrated in FIGS. 5-9, the highly stressed region 5 is mechanically strain-hardened by means of an apparatus 9, which has a strengthening tool 10, in those regions in which the nitriding layer 6 has previously been removed. The mechanical strain hardening in the embodiments of the method according to FIGS. 5 and 6 is close rolling. Alternatively, mechanical strain hardening by means of impact hardening, as illustrated in FIG. 7, or shot peening may also be envisaged. In strain hardening by means of close rolling or impact hardening, a defined force is applied to the component, whereas, in shot peening, an undefined force action is applied by the balls acting on the crankshaft 1.

As a result of the strain hardening, depending on the force applied and on the machining duration, a considerably higher depth action of the stresses and of the strength increase arising from this and also an increase in the surface hardness are achieved, as compared with the state in which the crankshaft 1 is merely nitrided.

During the strain hardening, it is possible to apply such a high force to the crankshaft 1 that very fine incipient cracks occur on the surface of this, but do not have an adverse influence on the strength properties of the crankshaft 1, since they cannot be propagated on account of the internal pressure stresses introduced. On the contrary, as a result of this increase in the close rolling force, an even higher fatigue strength of the crankshaft 1 is achieved which is not diminished by the incipient cracks. This increase in the strengthening force which leads to the formation of the incipient cracks may in this case lie up to 40% above the force usually applied by close rolling, this advantageously being adopted in order to increase the fatigue strength of the crankshaft 1.

This procedure of increasing the strain hardening force in this way such as to give rise on the surface of the crankshaft 1 to incipient cracks may also be envisaged in the case of crankshafts 1 which are heat-treated, for example, by induction hardening or another suitable method instead of by nitriding.

After the mechanical strain hardening, it is possible to carry out a final machining of the crankshaft 1 in terms of its positional and/or dimensional tolerances, this preferably taking place by means of grinding. This is also possible in the subsequent strain-hardened highly stressed regions 5. Such remachining of the surface of the main bearings 2 and/or of the connecting rod bearings 3 and/or of the crank webs 4 may in many instances also be restricted to a straightforward reduction of surface roughness if a sufficient accuracy of the dimensional and positional tolerances is achieved or maintained by means of the nitriding method.

Since the highly stressed regions 5 have been strengthened by means of a depth-active strain hardening method, a greater removal of the nitriding layer 6 for dimensional and positional final machining may be permitted on those cylindrical faces of the main bearing 2 or the connecting rod bearing 3 which are, if appropriate, to be remachined and on the run-on collar faces of the crank webs 4. The above-described possible production of the undercut 8 also advantageously makes it possible to have a simpler dimensional and positional final machining, for example by grinding.

The highly stressed regions 5 of the crankshaft 1 which are machined by means of strain hardening may also be machined by means of a cutting method. In this case, the quantity of material removed, that is to say the depth of the cutting machining, depends on the depth action previously achieved by means of strain hardening, and therefore, in the case of a correspondingly high depth action of, for example, 1 mm, achieved by the strain hardening, it is perfectly possible to remove 0.2 to 0.4 mm of material in the crankshaft 1. If the undercut 8 indicated above is provided, no reworking is necessary in this region during the mechanical remachining of the crankshaft 1.

FIG. 5 shows a first embodiment of the apparatus 9 for the mechanical strain hardening of the component subjected to torsional and flexural stress, in the present case the crankshaft 1. The apparatus 9 has the strengthening tool 10 suitable for applying the force to the crankshaft 1, and a steading device 11 absorbing the force of the strengthening tool 10. As described below, the steading device 11 prevents damage to the nitriding layer 6 still located on the main bearing 2 or, in the case of the connecting rod bearing 3, on this.

The strengthening tool 10 is designed in the present case as a close rolling tool and has a plurality of strengthening rollers 12 which are mounted rotatably on a guide roller 13 and serve for strain-hardening the highly stressed regions 5 of the crankshaft 1, that is to say, as already mentioned, for carrying out the third step of the method described above.

The steading device 11 has a running roller 14 which is connected to the main bearing 2 and which is mounted on a bearing bolt 16 via a bearing device 15. The bearing device 15 thus supports the steading device 11 in such a way that the latter is capable of absorbing even forces which act on the surface of the crankshaft 1, in the present case on the main bearing 2, at an angle different from 90°. For this purpose, in the present case, the bearing device 15 is designed as a self-aligning ball bearing, but it could also be a self-aligning roller bearing or another bearing device 15 which in the way described absorbs the obliquely acting forces. In FIG. 5, the angle α illustrates the required possible oscillation compensating movement in the event of an oblique position of the strengthening tool 10. In general, that is to say also in the embodiments of the strengthening tool 10 which are described later, the angle α may amount to up to 15°, an oblique position of up to a maximum of 5-10° being more probable. The dimension "x" shows the distance, required for this movement of the guide roller 13, between the guide roller 13 and the bearing bolt 16.

FIG. 6 illustrates a further embodiment of the apparatus 9. In this case, two strengthening tools 10 are provided, which have respective strengthening rollers 12 and are offset essentially by 180° with respect to one another. Here, in each case, one strengthening tool 10 assumes the function of the steading device 11 for the other strengthening tool 10a, although they act, free of contact and therefore free of force, on the face of the main bearing 2. This freedom from contact and freedom from force is due to the fact that the strengthening rollers 12 act only on the highly stressed regions 5 and therefore are supported only there. Instead of the two strengthening tools 10 and 10a, three or more strengthening tools 10, 10a, etc. could also be provided, which should then be arranged so as to be distributed at uniform intervals around the crankshaft 1.

In addition to the strengthening rollers 12 used with an angle of incidence of approximately 35+/−5 degrees, according to FIGS. 5 and 6, in a further method step a second strengthening tool 10 may also be used, the strengthening rollers 12 of which are set at an angle of 0 to approximately 25 degrees with respect to the perpendicular to the respective running face of the main bearing 2 and/or of the connecting rod bearing 3. A further, that is to say third strengthening tool 10 could be used, the strengthening rollers 12 of which are set at an angle greater than 40 degrees and up to 90 degrees with respect to the perpendicular to the running face of the main bearing 2 and/or of the connecting rod bearing 3. In this case, therefore, overall three strengthening tools 10 with correspondingly oriented strengthening rollers 12 would be used in order to consolidate the radius. A precondition for using the strengthening tool 10 in the case of an angle particularly in the region of 0 degrees and particularly in the region of 90 degrees is that it must be possible for the force to be applied to the strengthening rollers 12.

Alternatively to this, a strengthening tool 10 could also be used, the strengthening rollers 12 of which have a greater radius than the radius of the undercut 8. For example, in the case of a radius of 10 mm of the undercut 8, the radius of the strengthening roller 12 could amount to 10.1 mm to 10.5 mm, which would correspond to what is known as an oscillation ratio ("relation of contact") of 1.0 to 1.05.

What is achieved in both instances is that the entire region of the undercut 8, that is to say even those regions which cannot be reached by a strengthening tool having a continuous radius, are strengthened. In other words, by a plurality of strengthening tools 10 being used or by the strengthening tool 10 being adapted to the radius of the undercut 8, the entire surface exposed as a result of cutting machining is subsequently strengthened, and there is, over the entire undercut 8, no region which is neither nitrided nor strain-hardened, with the result that the formation of a weak point is prevented.

A further embodiment of the apparatus 9 is illustrated in FIG. 7. Here, the strengthening tool 10 has a plurality of rams 17 which are actuated via a deflecting roller 18 in a way not illustrated in any more detail and which consequently apply the force by pulsating hammering to the highly stressed regions 5 of the crankshaft 1. At their ends connected to the highly stressed regions 5, the rams 17 are provided with respective balls 19. The steading device 11 which counteracts the force applied by the strengthening tool 10 is provided with a bearing device 15 which in this case is designed as a plain bearing and which is likewise capable of absorbing even forces which act on the surface of the crankshaft 1 at an angle different from 90°. Of course, forces acting perpendicularly on the surface of the crankshaft 1 are also absorbed by the bearing device 15.

In addition to the rams 17 according to FIG. 7 which are used with an angle of incidence of approximately 35+/−5 degrees, in a further method step a second strengthening tool 10 may also be used, the rams 17 of which are set at an angle of 0 to approximately 25 degrees with respect to the perpendicular to the respective running face of the main bearing 2 and/or of the connecting rod bearing 3. A further, that is to say third strengthening tool 10 could be employed, the rams 17 of which are set at an angle greater than 40 degrees and up to 90 degrees with respect to the perpendicular to the respective running face of the main bearing 2 and/or of the connecting rod bearing 3. In this case, therefore, overall three strengthening tools 10 with correspondingly oriented rams 17 would be used in order to consolidate the radius. A precondition for using the strengthening tool 10 in the case of an angle particularly in the region of 0 degrees and particularly in the region of 90 degrees is that it must be possible for the force to be applied to the rams 17.

Alternatively to this, a strengthening tool 10 could also be used, of which the ram 17 or the balls 19 arranged on it has a larger radius than the radius of the undercut 8. For example, in the case of a radius of 10 mm of the undercut 8, the radius of the balls 19 could amount to 10.1 mm to 10.5 mm, which would correspond to what is known as an oscillation ratio ("relation of contact") of 1.0 to 1.05.

What is achieved in both instances is that the entire region of the undercut 8, that is to say also those regions which cannot be reached by a strengthening tool having a continuous radius, are strengthened. In other words, by a plurality of strengthening tools 10 being used or by the strengthening tool 10 being adapted to the radius of the undercut 8, the entire surface exposed as a result of cutting machining is subsequently strengthened, and, over the entire undercut 8, there is no region which is neither nitrided nor strain-hardened, with the result that the formation of a weak point is prevented. In both instances, if appropriate, the deflecting roller 18 must be replaced by toggle levers, wedges or other suitable force introduction elements.

With regard to the embodiment of the strengthening tool 10 with the rams 17, the design of the bearing device 15 as a plain bearing is an embodiment which is more suitable than a rolling bearing, since, when a ball bearing or roller bearing is used as the bearing device 15, the pulsating hammering of the strengthening tool 10 could present problems with regard to the durability of said bearing device. In this case, the two faces of the plain bearing should be adapted as exactly as possible to one another, while oil, grease or another suitable lubricant may be located between these faces.

Figure 8:
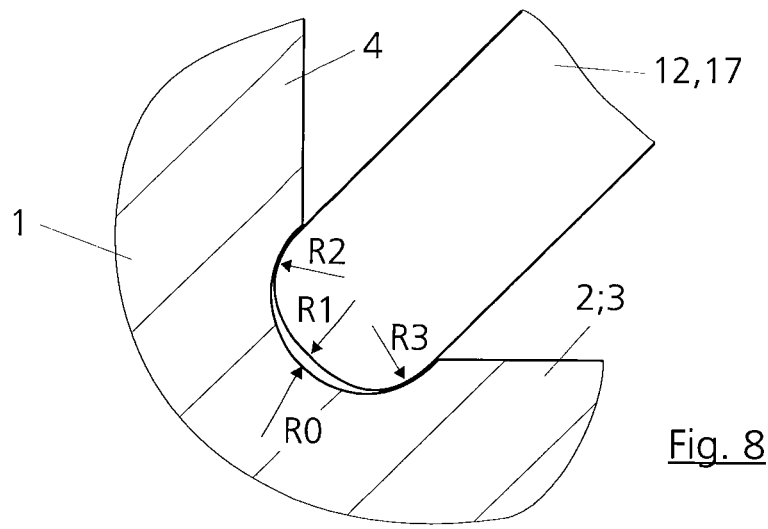
FIG. 8 shows a further alternative embodiment of the apparatus for carrying out the third step of the method according to the invention.

FIG. 8 shows a further embodiment of a strengthening tool 10 which may be designed both as a close rolling tool and as an impact hardening tool. In the illustration of FIG. 8, which corresponds in terms of its view to the illustration of FIGS. 5, 6 and 7, the view of the strengthening roller 12 is the same as the view of the ram 17, and therefore this component is given the two reference symbols 12 and 17. The strengthening roller 12 or the ram 17 has, in the region in which the tool is in engagement with the crankshaft 1, three different radii. In this case, the middle radius R1 is greater than the radius, designated by R0, of the undercut 8 of the crankshaft 1. The two outer radii R2 and R3 adjoining the middle radius R1 on both sides correspond to 0.9 to 1.1 times the radius R0 of the undercut 8. In other words, the outer radii R2 and R3 of the strengthening roller 12 or of the ram 17 may be slightly smaller than, equal to or even slightly larger than the radius of the undercut 8. A better oscillation or better contact of the strengthening roller 12 or ram 17 with the radius R0 of the undercut 8 is thereby achieved. The radii R2 and R3 may, if appropriate, also be of different size, depending on the geometry of the undercut 8. Furthermore, what is thus achieved is that the entire region of the undercut 8, that is to say also those regions which cannot be reached by a strengthening tool having a continuous radius, are in this case strengthened. This strengthening tool 10 illustrated in FIG. 8 could, in terms of the time sequence, be employed after one of the strengthening tools 10 illustrated in FIG. 5, 6 or 7, in order, as already mentioned, to strengthen the entire undercut 8. The radius R1 in the middle region of the strengthening roller 12 or of the ram 17 should therefore be considerably larger than the radius R0 of the undercut 8, in order to prevent the strengthening roller 12 or ram 17 from coming into contact in its middle region with the undercut 8.

Figure 9:
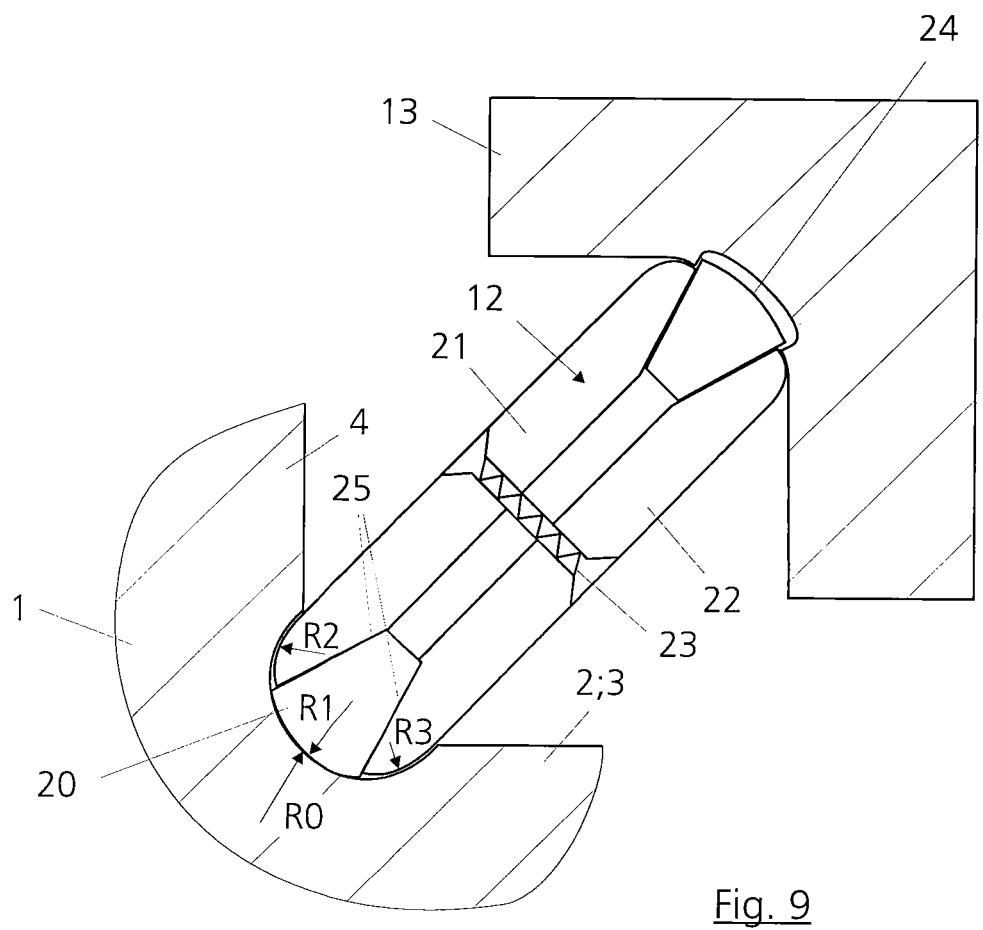
FIG. 9 shows a further alternative embodiment of the apparatus for carrying out the third step of the method according to the invention.

A further embodiment of the strengthening tool 10 is illustrated in FIG. 9. The strengthening tool 10 has, in a similar way to those according to FIGS. 5 and 6, at least one strengthening roller 12 which has a plurality of parts, specifically a middle roller part 20, two outer roller parts 21 and 22 and a spring prestressing element 23. In this case, a free space 24 is located between the guide roller 13 and the middle roller part 20, with the result that the guide roller 13 bears only against the two outer roller parts 21 and 22. The middle roller part 20 in this case has a first radius R1, whereas the outer roller parts 21 and 22 have respective radii R2 and R3 which are smaller than the radius R1 of the middle roller part 20. Furthermore, the outer roller parts 21 and 22 are set back slightly with respect to the middle roller part 20 in the direction of the crankshaft 1, so that the middle roller part 20 first comes into contact with the undercut 8 of the crankshaft 1. The force is therefore introduced into the middle roller part 20 via the outer roller parts 21 and 22 and via a bearing face 25 which is located in each case between the outer roller parts and 22 and the middle roller part 20. The middle roller part 20 in this case experiences a counterforce from the crankshaft 1 and, via the oblique bearing face 25, presses the outer roller parts 21 and 22 outward counter to the force of the spring prestressing element 23, so that, after a specific machining time by the middle roller part 20, the outer roller parts 21 and 22 also contribute to the machining of the undercut 8 of the crankshaft 1. The outer roller parts 21 and 22 at this moment therefore form a continuous line with the middle roller part 20. As a result, in the similar way to the embodiments described above, in which either a plurality of strengthening tools 10 are used in succession or one and the same strengthening tool 10 has a plurality of different radii, all the regions of the undercut 8 are strengthened, as a result of which, in turn, the entire region of the undercut 8, that is to say also those regions which cannot be reached by a strengthening tool having a continuous radius, are strengthened.

Said method affords a component subjected to torsional and flexural stress, in the present case the crankshaft 1, which not only has the advantages arising from nitriding treatment, such as a higher surface hardness and higher torsional strength, but, due to the strain hardening, also possesses a higher strength, in particular higher flexural strength, in the highly stressed regions 5. It should be noted that all the strengthening tools 10 described herein may also be employed in methods where the crankshaft has not been provided with a nitriding layer which has been removed before the strain hardening.

The invention claimed is:

1. A method for increasing the strength of a component subjected to torsional and flexural stress, the method comprising:
   in a first step essentially the entire component being provided with a nitriding layer,
   in a second step the nitriding layer being at least partially removed in at least one highly stressed region of the component by means of cutting machining,
   in a third step, the at least one highly stressed component region at least partially freed of the nitriding layer being mechanically strain-hardened, and,
   wherein during the second step further material of the component is also removed in addition to the nitriding layer, in order to form an undercut in the at least one highly stressed region.

2. The method as claimed in claim 1, wherein, after the mechanical strain hardening, a final machining of the component in terms of its positional and/or dimensional tolerances takes place.

3. The method as claimed in claim 1 or 2, wherein the mechanical strain hardening is carried out by means of close rolling.

4. The method as claimed in one of claims 1 or 2, wherein the component is nitrided by means of gas nitriding, carbonitriding or plasma nitriding.

5. The method as claimed in one of claims 1 or 2, wherein the nitriding layer is removed by turning, milling or grinding.

6. The method as claimed in one of claims 1 or 2, wherein the component used is a crankshaft.

7. The method as claimed in claim 6, wherein the at least one highly stressed region is a transition region from a main bearing or connecting rod bearing to a crank web.

8. The method as claimed in one of claims 1 or 2, wherein, during the mechanical strain hardening of the highly stressed region of the component, such a force is applied that incipient cracks occur on the surface of the component.

9. The method as claimed in claim 1 further comprising another step of strengthening the material of the component.

10. The method as claimed in claim 1 wherein:
    the component comprises a crankshaft;
    the at least one highly stressed region is a transition region from a main bearing or connecting rod bearing to a crank web; and
    the transition region between the main bearing or the connection rod bearing and the crank web is designed as a transition radius tangent to the respective face.

11. The method as claimed in claim 1 wherein the nitriding layer is present at least until the forming of the undercut.

* * * * *